United States Patent Office 2,853,491
Patented Sept. 23, 1958

---

2,853,491

3.5-DIOXO-PYRAZOLIDINES BICYCLICALLY SUBSTITUTED IN THE 4-POSITION

August Kottler and Heinrich Scheffler, Biberach (Riss), Wurttemberg, Germany, assignors to Geigy Chemical Corporation, New York, N. Y., a corporation of Delaware No Drawing. Application August 2, 1957
Serial No. 675,832

Claims priority, application Switzerland May 7, 1954

3 Claims. (Cl. 260—310)

The present invention is concerned with therapeutically valuable 3.5-dioxo-pyrazolidines bicyclically substituted in the 4-position as well as the salts thereof with inorganic and organic bases, and with the production thereof. 1.2-diphenyl-4-n-butyl - 3.5 - dioxo - pyrazolidine has attained great importance as a therapeutical preparation for the treatment of rheumatic diseases. In patents concerning this subject, e. g. German Patent No. 814,150, French Patent No. 983,378 and U. S. Patent No. 2,562,830, the 1.2-diaryl-3.5-dioxo-pyrazolidines are covered generally which, in the 4-position, are substituted by a carbon structure with 2–10 carbon atoms bound over a primary or secondary carbon atom. Compounds with different aliphatic or araliphatic radicals as well as the cyclopentyl and the cyclohexyl radical as substituents of the 4-position are described in the cited patents. However, no compounds with a bicyclic cycloaliphatic group in the 4-position are mentioned.

It has now been found that such compounds of the general formula:

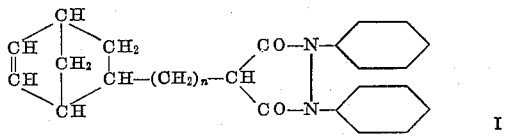

I wherein $n$ represents an integer from 0 to 1, can be easily produced and that they have valuable therapeutical properties, in particular antipyretic, antiphlogistic and analgetic activity.

These new compounds can be produced, in principle, by ring-closing condensation of reactive functional derivatives of correspondingly substituted malonic acids with hydrazobenzene in the manner which has already been described for the already known compounds. The production is thus characterised by condensing, preferably in the presence of an alkaline condensation agent, a substituted malonic acid ester of the general formula:

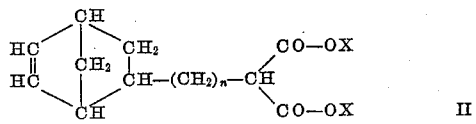

II wherein X represents a hydrocarbon radical, in particular a lower alkyl radical and the integer $n$ has the meaning given above, with a hydrazobenzene of the formula:

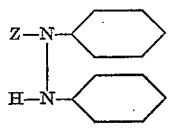

wherein Z represents hydrogen or an acyl radical which can be easily split off, or a substituted malonic acid derivative of the general formula:

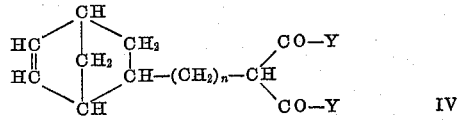

IV wherein Y represents chlorine, bromine or an acyloxy radical, is condensed, preferably in the presence of an acid binding agent, with hydrazobenzene.

Alkali metals or compounds thereof such as alcoholates, amides, hydroxides or hydrides can be used as alkaline condensation agents for the first production process mentioned above. The condensation is performed, preferably in the presence of organic solvents such as e. g. methanol, ethanol, propanol, butanol, benzene, toluene, xylene etc., and at a raised temperature, preferably between 80 and 140° C. In particular tertiary organic bases such as pyridine or dimethyl aniline, triethyl- and also tributyl-amine used in the presence or absence of additional organic solvents such as e. g. diethyl- or di-isopropyl-ether are suitable as acid binding agents for the second process mentioned above. In this case, the ring is closed at low temperatures, advantageously in the neighbourhood of 0°.

Instead of substituted malonic acid diesters or dihalides, also substituted malonic acid monoester derivatives of the general formula:

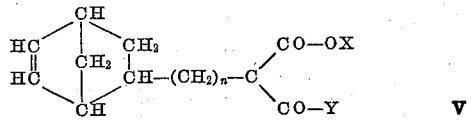

V can be used as starting materials. These are converted into the desired end products of the general Formula I in two steps. In the first step analogous to the second production process named above, they are condensed with hydrazobenzene in the presence of an acid binding agent in the cold to form substituted malonic acid ester hydrazides. The second step analogous to the first production process above named comprises ring closure by means of an alkaline condensing agent in the warm.

The substituted malonic acid diesters of the general Formula II required for the reaction can be produced, for example, by condensation of sodium malonic acid diesters with halogen compounds of the general formula:

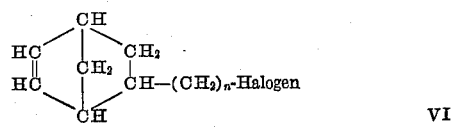

VI

These halogen compounds of the general Formula VI can be produced by the addition of cyclopentadiene to unsaturated aliphatic halogen compounds such as e. g. vinyl bromide, allyl chloride or methallyl chloride, see for example K. Alder and E. Windemuth, B., 71, 1939 (1938) ($n=1$) and J. D. Roberts et al., J. Am. Chem. Soc., 72, 3116 (1950) ($n=0$). The acid halides are obtained from the esters by alkaline saponification, liberation of the acids and treatment thereof with inorganic acid halides such as thionyl chloride, phosphorus pentachloride or phosphorus tribromide. Mixed anhydrides in which Y represents the acetoxy radical are obtained from the reaction of the free malonic acids with excess acetic anhydride.

Examples of substituted malonic acid esters of the general Formula II are: (2.5-endomethylene-Δ³-cyclohexenyl)-malonic acid diethyl ester, (2.5-endomethylene-Δ³-cyclohexenyl-methyl)-malonic acid diethyl ester.

The new bicyclically substituted 3.5-dioxo-pyrazolidines dissolve easily both in the usual organic solvents and also, because of the presence of an acid hydrogen atom, probably in the tautomeric enol form, in diluted aqueous alkalies. Also the new compounds form salts with other inorganic as well as with organic bases.

The aqueous solutions of the alkali salts of the new compounds have also the property of promoting the solubility of pyrazole derivatives.

The following examples serve to further illustrate the production of the new compounds.

EXAMPLE 1

*1.2-diphenyl-4-(2'.5'-endomethylene-Δ³'-cyclohexenyl-methyl)-3.5-dioxo-pyrazolidine*

9.2 g. (0.05 mol) of hydrazobenzene and 13.3 g. (0.05 mol) of (2.5-endomethylene-Δ³-cyclohexenyl-methyl)-malonic acid diethyl ester are dissolved by boiling under reflux in 40 ml. of absolute alcohol in a 100 ml. flask with a ground top. After 1 hour, 10 ml. of 30% methanolic sodium ethylate are added to the solution, a sloping condenser is fitted and the whole is heated to 110–120° C. in an oil bath for 16 hours, during which time the alcohol-methanol mixture gradually distills off. The residue is taken up with 250 ml. of water, extracted with ether and filtered over active charcoal. The pH value of the absolutely clear filtrate is adjusted to 3.0 with 10% hydrochloric acid whereupon a yellow crystalline precipitate separates out. This is filtered off under suction, washed with water and, while still damp, it is recrystallised from about 300 ml. methanol. The substance then has a melting point of 155° C.

EXAMPLE 2

*1.2-diphenyl-4-(2'.5'-endomethylene-Δ³'-cyclohexenyl)-3.5-dioxopyrazolidine*

25.2 g. (0.1 mol) of (2.5-endomethylene-Δ³-cyclohexenyl)-malonic acid diethyl ester and 27.6 g. (0.15 mol) of hydrazobenzene in 300 ml of absolute alcohol in a 1 litre flask with a ground top, are dissolved by warming and stirring. A solution of 3.43 g. (0.15 mol) of sodium metal in 100 ml of absolute alcohol is added to the mixture within 6–8 hours. At the same time, the alcohol is distilled off in a sloping condenser. The residue is taken up in 2 litres of water and further processed as described in Example 1. The compound so obtained melts at 149° C.

EXAMPLE 3

*4-(2'.5'-endomethylene-Δ³'-cyclohexenyl)-1.2-diphenyl-3.5-dioxopyrazolidine*

8 g. of dry pyridine are added to a suspension of 18.4 g. (0.1 mol) of hydrazobenzene in 150 ml. of abs. benzene and a mixture of 24.2 g. (0.1 mol) of (2.5-endomethylene-Δ³-cyclohexenyl)-malonic acid ethyl ester chloride in 50 ml. of abs. benzene is added dropwise while stirring and cooling with ice water. On completion of the addition, the reaction mixture is slowly heated while stirring and finally boiled for half an hour under reflux. After cooling, the precipitated pyridine-hydrochloride is filtered off under suction and washed several times with benzene.

A solution of 2.3 g. (0.1 g.-atom) sodium in 100 ml. of abs. ethanol is added within 4–5 hours to the filtrate, which contains the α-(2.5-endomethylene-Δ³-cyclohexenyl)-α-carbethoxy-acetyl-hydrazobenzene dissolved, while boiling and stirring. Benzene and ethanol are distilled off from the mixture at about the same rate. After adding the ethylate solution, the solvent mixture is completely evaporated off and the reaction mixture is heated in the vacuum for 6 hours at 140–150°.

After cooling, the raw product is worked up in the manner described in Example 2.

The product obtained melts, after recrystallisation from methanol, at 148–149°, and, mixed wtih the substance produced according to Example 2, shows no depression of the melting point.

The present application is a continuation-in-part of copending applications Serial No. 505,504, filed May 2, 1955, and Serial No. 547,531, filed November 17, 1955, said applications having been abandoned since the filing of the present application.

What we claim is:

1. A member selected from the group consisting of 3.5-dioxo-pyrazolidines bicyclically substituted in the 4-position, corresponding to the formula:

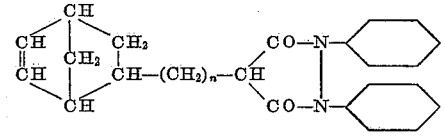

wherein *n* represents an integer from 0 to 1, and the salts thereof with alkali metal bases.

2. 1.2-diphenyl - 4 - (2'.5' - endomethylene - Δ³' - cyclohexenyl)-3.5-dioxo-pyrazolidine.

3. 1.2-diphenyl - 4 - (2'.5' - endomethylene - Δ³' - cyclohexenyl-methyl)3.5-dioxo-yprazolidine.

References Cited in the file of this patent

FOREIGN PATENTS

| 506,892 | Belgium | Nov. 30, 1951 |
| 508,085 | Belgium | June 28, 1952 |